Dec. 20, 1966  HAJIME ISHIDA  3,292,596

NIB UNIT FIXING DEVICE FOR WRITING PENS

Filed April 13, 1964  3 Sheets-Sheet 1

Hajime Ishida
INVENTOR.

BY Wenderoth, Lind
and Ponack, Attorneys

Dec. 20, 1966  HAJIME ISHIDA  3,292,596
NIB UNIT FIXING DEVICE FOR WRITING PENS
Filed April 13, 1964  3 Sheets-Sheet 2
FIG. 8
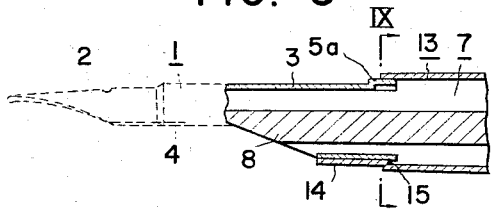
FIG. 11  FIG. 12  FIG. 13
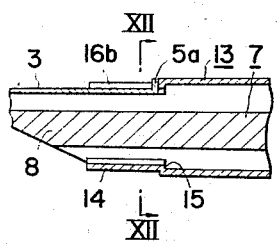 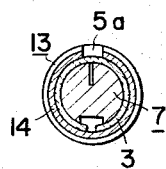 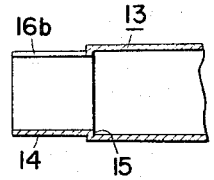
FIG. 14  FIG. 15  FIG. 16
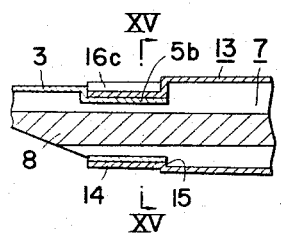 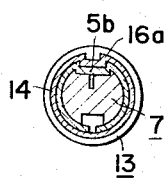 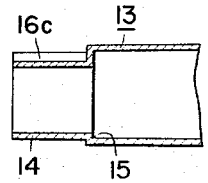
FIG. 17  FIG. 18  FIG. 19(A)
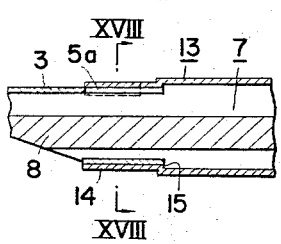 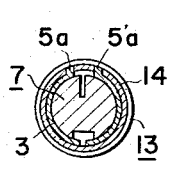 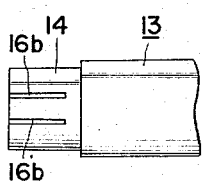
FIG. 19(B)
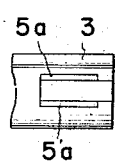
Hajime Ishida
INVENTOR.
BY Wenderoth, Lind
and Ponack, attorneys Dec. 20, 1966  HAJIME ISHIDA  3,292,596
NIB UNIT FIXING DEVICE FOR WRITING PENS
Filed April 13, 1964  3 Sheets-Sheet 3

Hajime Ishida
INVENTOR.

BY Wenderoth, Lind
and Ponack, attorneys

United States Patent Office 3,292,596
Patented Dec. 20, 1966

3,292,596
NIB UNIT FIXING DEVICE FOR WRITING PENS
Hajime Ishida, Hiratsuka-shi, Japan, assignor to Pairotto Man-Nen-Hitsu Kabushiki Kaisha, Tokyo-to, Japan
Filed Apr. 13, 1964, Ser. No. 359,087
Claims priority, application Japan, Apr. 19, 1963, 38/28,646
9 Claims. (Cl. 120—50)

This invention relates to writing pens and more particularly to a new and improved nib unit fixing device for writing pens.

Heretofore, in conventionel writing pens, particularly in fountain pens, it has been the common practice to secure the nib unit directly to the forward part of the holder barrel. Such a construction has caused extreme complication and difficulties in assembly and disassembly procedures. In some cases, moreover, the means of attachment based on such construction has not been adequate to prevent looseness or play in the nib unit.

It is an object of the present invention to overcome the above described difficulties by providing a novel nib unit fixing device, whereby the nib unit of a writing pen is securely locked.

More specifically, it is an object to provide a nib unit fixing device wherein the nib unit is locked by the forward end of a nib fixing cylinder having a feed bar in a manner such that loosening and rotation of the pen nib relative to the pen holder is positively prevented.

It is another object to provide a device of the above stated character having a simple construction which, moreover, facilitates assembly and disassembly of the component parts, whereby the nib unit may be readily removed or installed.

With the foregoing and other objects in view, the invention resides in the novel arrangement and combination of parts and in the details of construction as hereinafter more specifically described, reference being made to the accompanying drawings in which like and equivalent parts are designated by like reference characters, and in which.

Figure 9:
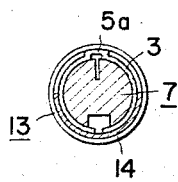
Figure 10:
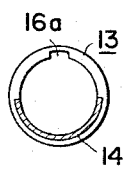

FIGS. 8, 11, 14, 17, and 20, inclusive, are sectional vertically sectioned elevational views showing six modifications of the device shown in FIGS. 1 through 7, said modifications being in the mode of locking the nib unit to the nib unit fixing cylinder;

FIGS. 9, 12, 15, 18, and 21 are sectional views along the lines IX—IX, XII—XII, XV—XV, XVIII—XVIII, and XXI—XXI, of the embodiments 8, 11, 14, 17, and 20, respectively;

FIG. 10 is a sectional view of the nib unit fixing cylinder of the embodiments of FIGS 8 and 9;

FIGS. 13 and 16 are vertically sectioned elevational views of the nib unit fixing cylinders of the embodiments of FIGS. 11 and 14, respectively;

FIG. 19(a) is a plan view of the nib fixing cylinder of the embodiment of FIG. 17;

FIG. 19(b) is a plan view showing engaged state of the said cylinder and nib body in the embodiment of FIG. 17.

Figure 20:
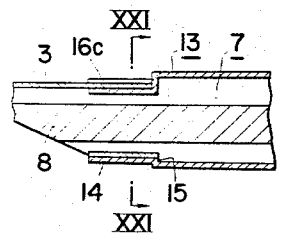
Figure 22A:
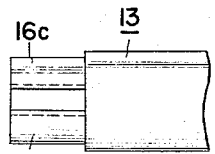
Figure 22B:
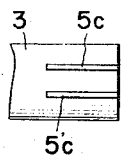
Figure 23:
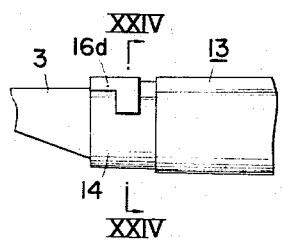
Figure 24:
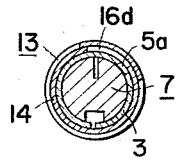
Figure 25A:
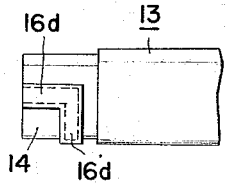
Figure 25B:
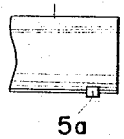

FIG. 22(a) is a plan view of the nib fixing cylinder of the embodiment of FIG. 20;

FIG. 22(b) is a plan view of a modified portion of the embodiment of FIG. 20;

FIG. 23 is an elevational view of the nib unit fixing cylinder of another embodiment of the invention;

FIG. 24 is a sectional view along the line XXIV—XXIV of FIG. 23;

FIG. 25(a) is a plan view of the nib unit fixing cylinder of the embodiment of FIG. 23; and FIG. 25(b) is a plan view of the nib base part of the embodiment of FIG. 23.

Throughout the present disclosure, the terms "forward" and "rear" are used with respect to the writing point which is taken as the forward end, and the terms "upper" and "lower" are used with respect to the position of the pen in the normal writing attitude.

Figure 1:
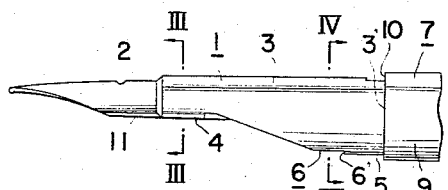
FIG. 1 is a side elevational view, with a part cut away, showing the exterior of a preferred embodiment in assembly state of the nib unit fixing device according to the invention.
Figure 3:
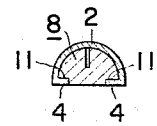
FIG. 3 is a cross sectional view taken along the plane indicated by line III—III in FIG. 1.
Figure 2:
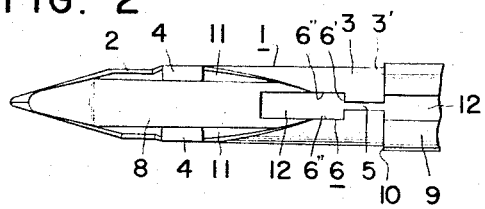
FIG. 2 is a bottom view of the device shown in FIG. 1.
Figure 4:
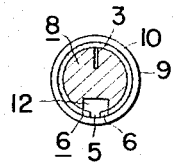
FIG. 4 is a cross sectional view taken along the plane indicated by line IV—IV in FIG. 1.

In the preferred embodiment of the invention shown in FIGS. 1 through 7, the writing point unit (hereinafter referred as the "nib unit") 1 consists of a pen nib 2 of semicircular cylindrical configuration and a nib base part 3 of cylindrical shape. The pen nib part 2 is provided at its two lower edges with inwardly bent, horizontal flanges 4, and the base part 3 is provided on its bottom part with a split gap 5 and a cutout 6 disposed contiguously forward of the gap 5 and having a greater width than the gap 5, as shown in FIG. 2.

As a central member to fit into the base part 3 of the nib unit 1, there is provided a feed bar 7 consisting of a forward projecting part 8 of semicircular cross section and a rear base part 9 of solid cylindrical shape of greater diameter than the projecting part 8, a shoulder 10 being formed at the juncture plane between the parts 8 and 9. The projecting part 8 is provided at its two bottom longitudinal edges with cutout 11, and a longitudinal groove 12 is formed along the bottom of the feed bar 7, extending over both the projecting part 8 and the base part 9.

Figure 5:
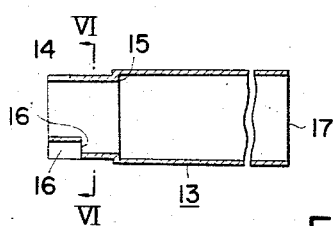
FIG. 5 is a foreshortened elevational view, in vertical section, showing an example of a nib unit fixing cylinder suitable for use in the device shown in FIGS. 1 through 7.
Figure 6:
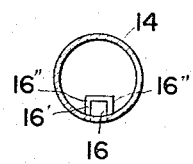
FIG. 6 is a cross sectional view taken along the plane indicated by line VI—VI in FIG. 5.

As a member to encompass and fit over the base part 9 of the feed bar 7 and, at the same time, over the rear end part of the nib base part 3 of the nib unit 1, there is provided a nib unit fixing cylinder 13 (shown independently in FIGS. 5 and 6). This nib unit fixing cylinder 13 is provided at its forward end with a forward end part 14 of reduced diameter, a shoulder 15 being formed on its internal wall at the juncture between the end part 14 and the main part of the cylinder 13. At the bottom of the end part 14, there is formed an inwardly protruding projection 16 having a width which is approximately equal to the width of the cutout 6 of the nib unit 1.

In the state of assembly of the nib unit 1 on and about the feed bar 7 as shown in FIGS. 1 through 4, the rear end surface 3' of the nib unit 1 is in abutted contact with the shoulder 10 of the feed bar 7, and the flanges 4 of the nib unit 1 are fitted into the cutout 11 of the feed bar 7. The sub-assembly so formed is referred to herein as the pen body.

Figure 7:
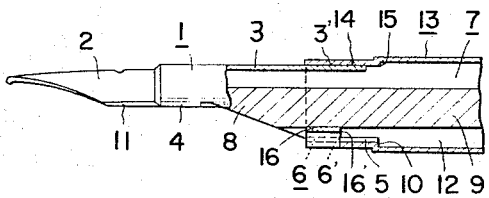
FIG. 7 is a side elevational view, partly in vertical section and with parts cut away, showing the essential parts and example of internal construction of the device shown in FIGS. 1 through 6.

In assembling the nib unit fixing device of the invention, the pin nib 2 of the nib unit 1 of the above mentioned pen body is inserted through the rear end 17 of the nib unit fixing cylinder 13 toward the end part 14 thereof until the projection 16 of the cylinder 13 enters the groove 12 of the feed bar 7, and the end shoulders 6' at the rear of the cutout 6 of the nib unit 1 abut against the end surface 16' of the inner side of the projection 16 of the cylinder 13, whereupon the forward movement of the pen body is arrested in the state shown in FIG. 7. The side walls 16" of the projection 16 is then in fitted engagement with the sides 6" of the cutout 6 of the nib unit 1, and the shoulder 10 of the feed bar 7 is then in abutted contact with the shoulder 15 in the interior of the cylinder 13.

By the above described construction according to the invention, when the pen body consisting of the feed bar 7 with the nib unit 1 affixed integrally thereto is in the state of assembly by being fitted in the cylinder 13, the end shoulders 6' of the cutout 6 of the nib unit 1 are engaged with the end surface 16' of inner side of the projection 16 of the cylinder 13. Accordingly, the nib unit 1 is prevented from moving further in the direction of the pin tip. Furthermore, since the rear end 3' of the nib unit 1 is abutting against the shoulder 10 of the feed bar 7, the nib unit 1 is prevented from moving rearward toward the inner part of the cylinder 13. Still furthermore, since the sides 6" of the cutout 6 of the nib unit 1 are engaged with the side walls 16" of the projection 16 of the cylinder 13, the pen body is prevented from rotating.

While in the above described embodiment of the invention, the rear end surface of the pen is abutting against a shoulder of the feed bar, it is also possible to provide a lug or projection on the nib unit fixing cylinder extending inwardly to set the position of the nib unit. It is also possible to modify, in various manner, the embodiment illustrated in FIGS. 1 through 7. Examples of such modified construction are shown in FIGS. 8 through 28, inclusive, in which only modified parts of the embodiment illustrated in FIGS. 1 to 7 are shown and the like members as those in the said embodiment are indicated by like reference characters.

In each of the following examples, the flanges of the pen nib part of the pen nib abut the outer surface of the forwardly projecting part of the feed bar, and the nib base part of the pen nib abut the outer surface of the feed bar, whereby the pin nib is fixed to the feed bar, as shown in FIGS. 1–7. These features are not shown in the drawings of the embodiments of FIGS. 8–25.

In the modification shown in FIGS. 8, 9, and 10, an outward projection 5a is provided on the rear upper end of the nib base part 3 of the nib unit 1 to engage with a longitudinal groove 16a formed on the inner wall of the nib unit fixing cylinder 13 at its forward upper end.

In the modification illustrated in FIGS. 11, 12, and 13, an outward projection 5a is provided on the rear upper end of the nib base part 3 of the nib unit 1 adapted to engage with a longitudinal, forwardly opened slot 16b formed along the upper part of the forward end 14 of the nib unit fixing cylinder 13.

In the modification illustrated in FIGS. 14, 15, and 16, the rear upper part of the nib base part 3 of the nib unit 1 is provided with a longitudinal, inwardly recessed groove 5b adapted to receive and engage with an inwardly projecting, longitudinally extending ridge 16c formed on the upper inner wall of the forward end part 14 of the cylinder 13. The recessed groove 5b and the ridge 16c may be respectively formed by press forming.

In the modification shown in FIGS. 17, 18, and 19, the rear upper end of the nib base part 3 of the nib unit 1 is provided with two outward projections 5a and 5'a adapted to fit into engagement respectively with longitudinal, forwardly opened slots 16b and 16'b formed on the upper part of the forward end part 14 of the cylinder 13.

Figure 21:
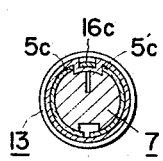

In the modification shown in FIGS. 20, 21, and 22, the rear upper end part of the nib base part 3 of the nib unit 1 is provided with two parallel, cutout slots 5c and 5'c extending in the longitudinal direction and opening to the rear to fit into engagement with a longitudinal, sunken trough 16c with arcuate bottom formed by pressing the upper part of the forward end part 14 of the cylinder 13, the vertical side walls of the trough 16c fitting into the slots 5c and 5'c, and the tongue of the nib base part 3 between the slots 5c and 5'c fitting into the trough 16c in contact with the bottom thereof.

In the modification shown in FIGS. 23, 24, and 25, an outwardly formed projection 5a is provided on the upper rear part of the nib base part 3 of the nib unit 1 to fit into locked engagement with an outwardly protruding, L-shaped latch slot portion 16d formed on the upper part of the forward end part 14 of the cylinder 13 and opened forwardly, the said projection 5a being made locked in the bent part 16'd of the latch slot 16d by turning the nib unit 1 relative to the cylinder 13.

As described above, the present invention provides a nib unit fixing device wherein the nib unit is locked securely to a nib unit fixing cylinder in which a feed bar is snugly fitted, a cutout in the nib unit being engaged at the same time with a projection formed on the feed bar. Thus, axial movement and rotation of the nib unit relative to its supporting parts are effectively prevented. Moreover, the nib unit is thus fixed in a manner independent of the pen holder barrel. Accordingly, the present invention affords simple yet positive installation of the pen body by the mere insertion of the nib unit fixing cylinder with the nib unit locked thereto into the pen holder barrel. Furthermore, by merely extracting the nib unit fixing cylinder from the pen holder barrel, the nib unit can be readily removed, whereby replacement of the nib unit is greatly facilitated. Accordingly, the invention affords secure locking of the nib unit and, moreover, easy assembly and disassembly of the nib unit and related parts.

It is to be understood, of course, that the foregoing disclosure relates to a preferred embodiment of the invention and certain modifications thereof and that it is intended to cover further changes and modifications of the examples of the invention herein chosen for the purposes of the disclosure, which do not constitute departures from the spirit and scope of the invention as set forth in the appended claims.

What is claimed is:

1. A nib unit fixing device for writing pens, comprising a nib unit composed of a cylindrical nib base part and a semicylindrical pen nib extending forwardly from said nib base part and having inwardly bent flanges at both edges thereof, a feed bar extending through said nib unit and having a forwardly projecting portion have a semicylindrical cross section, said nib unit being placed against the outer surface of said feed bar with said flanges against the surfaces of said forwardly extending projecting portion of said feed bar for fixing said nib unit to said feed bar, and a nib unit mounting cylinder around said nib unit, one of said cylinder and unit having at least one projection thereon and the other having at least one recess therein in which said projection is engaged for fixing said nib unit with respect to said mounting cylinder.

2. A nib unit as claimed in claim 1 in which said feed bar has an outwardly projecting circumferentially extending shoulder thereon against which the rear end of said nib unit bears, and said nib unit mounting cylinder has an inwardly projecting circumferentially extending shoulder against which said outwardly projecting shoulder on said feed bar bears, whereby said nib unit is fixed on said feed bar for the prevention of movement rearwardly thereof, and said feed bar is fixed in said mounting cylinder against movement forwardly thereof.

3. A nib unit as claimed in claim 1 in which said nib unit has a cutout at the rear of the bottom thereof which constitutes said recess, and said projection is an outwardly extending projection on the forward end of said nib unit mounting cylinder and having a shape which fits tightly into said recess.

4. A nib unit as claimed in claim 1 in which said projection is an outwardly extending projection on the nib unit, and said nib unit mounting cylinder having a groove in the inside surface of the wall thereof which constitutes said recess and into which said projection fits.

5. A nib unit as claimed in claim 1 in which said nib mounting unit has a longitudinally extending forwardly opening slot at the forward end thereof which constitutes said recess, and said projection being an outwardly extending projection on said nib unit, which projection fits into said slot.

6. A nib unit as claimed in claim 1 in which said nib unit has a longitudinally extending groove therein which constitutes said recess, and said projection comprises a longitudinally and inwardly extending ridge on said nib unit mounting cylinder fitting into said groove.

7. A nib unit as claimed in claim 1 in which there are two projections constituted by two outwardly extending projecting members on said nib unit, and there are two recesses, said nib unit mounting member having two longitudinally extending forwardly opening slots therein constituting said recess and receiving said projecting members therein.

8. A nib unit as claimed in claim 1 in which there are two projections constituted by two inwardly projecting members on said nib unit and a joining member extending between said inwardly projecting members to define a trough, and there are two recesses, said nib unit having two longitudinally extending rearwardly opening slots therein constituting said recesses and receiving the projecting members of said trough therein.

9. A nib unit as claimed in claim 1 in which said nib unit mounting member has an L-shaped outwardly projecting trough in the internal wall thereof constituting said recess, and said nib unit has an outwardly extending projection thereon engageable in said L-shaped slot.

References Cited by the Examiner

UNITED STATES PATENTS

| | | | |
|---|---|---|---|
| 1,315,373 | 9/1919 | Luck | 120—50 X |
| 2,089,449 | 8/1937 | Sypher | 120—51 |
| 2,375,770 | 5/1945 | Dahlberg | 120—50 X |
| 2,422,351 | 6/1947 | Hanle | 120—52 |
| 2,811,948 | 11/1957 | Kahn et al. | 120—50 |
| 2,987,044 | 6/1961 | Young | 120—51 |

LAWRENCE CHARLES, *Primary Examiner.*